No. 772,779. PATENTED OCT. 18, 1904.
F. BURGEMEISTER.
GAS WASHER.
APPLICATION FILED JULY 25, 1903.
NO MODEL. 2 SHEETS—SHEET 1.

WITNESSES:
W. M. Avery
H. J. Bernhard

INVENTOR
Friedrich Burgemeister
BY
Munn & Co.
ATTORNEYS.

No. 772,779. Patented October 18, 1904.

UNITED STATES PATENT OFFICE.

FRIEDRICH BURGEMEISTER, OF CELLE, GERMANY.

GAS-WASHER.

SPECIFICATION forming part of Letters Patent No. 772,779, dated October 18, 1904.

Application filed July 25, 1903. Serial No. 166,994. (No model.)

*To all whom it may concern:*

Be it known that I, FRIEDRICH BURGEMEISTER, director of the gas-works of Celle, a subject of the King of Prussia, Emperor of Germany, residing at Celle, Province of Hanover, Germany, have invented an Improved Construction of Gas-Washers, of which the following is a specification.

This invention relates to an improved construction of gas-washers for purifying gases, which is mainly intended to replace those scrubbers used in the manufacture of illuminating-gas in which hurdles, sheet-metal trays, coke, and the like are usually employed for freeing the gas flowing through from tar and ammonia.

Gas-washers are known in which a subdivision of the water-supply is effected by means of sieves, plates, or revolving vanes. These apparatus, however, operate with large quantities of water and partly with considerable motive power, so that the working is very expensive.

In the construction of washers according to the present invention the purification of the gases is effected by a peculiar arrangement for spraying the liquid.

The improved gas-washers when used in the place of scrubbers and ordinary washers in gas-works and coke-ovens enables the ammonia and the like to be separated from the gas in the simplest and most perfect manner with a comparatively small expenditure of water. The spraying can be effected with suitable liquids and in several consecutive apparatus, ammonia-water being employed in the first vessel in the case of the production of illuminating-gas and in the last apparatus pure water. The employment of a comparatively small quantity of water is rendered possible according to this invention by the fact that the liquid entering the apparatus through a narrow nozzle falls upon plates or rings arranged at such distances below the nozzle and below each other that a particularly fine and complete spraying of the liquid is effected, so that an intimate contact of the liquid with the gas takes place, and the liquid in consequence takes up a large quantity of matter from the gas.

The gas-washer can also serve for the precipitation of tar and other impurities, in particular also of dust from blast-furnace gases, as also generally for the purification of gases for motive power or for atomizing anthracene-oil for separation of the naphthalene from the illuminating-gas.

The accompanying drawings show, by way of example, a gas-washer constructed according to this invention.

Figure 1:
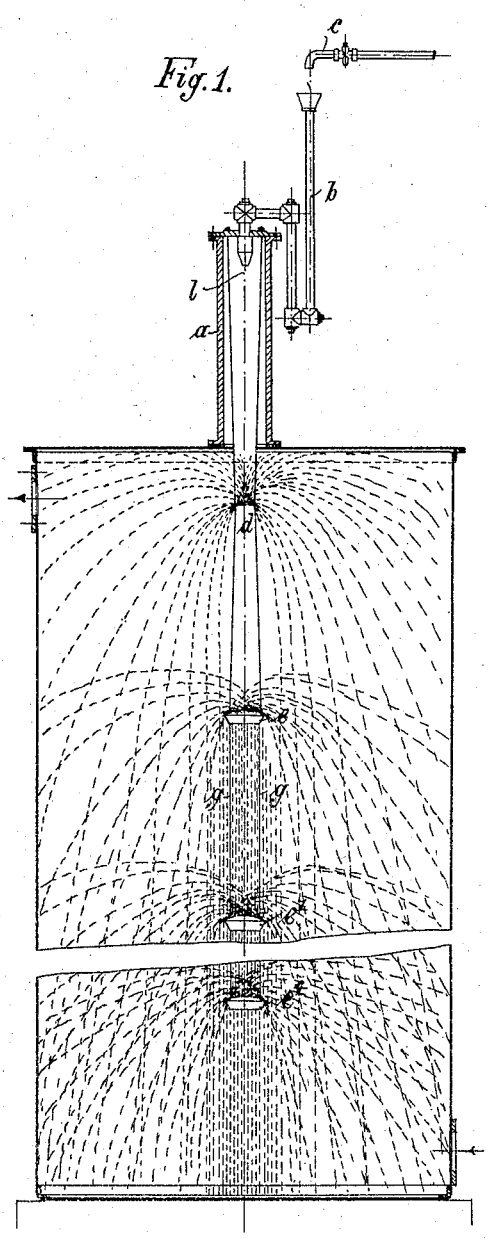
Figure 2:
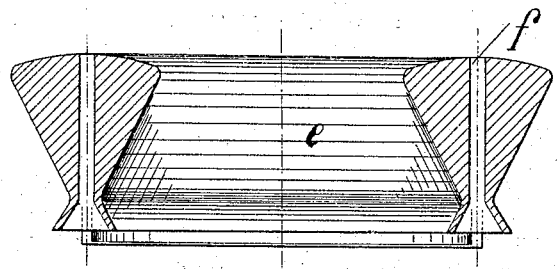

Figure 1 shows a vertical section; Fig. 2, a section through a spraying-ring, to an enlarged scale; and Fig. 3, a plan of the spraying-ring.

On the top of the gas-washer casing, Fig. 1, is a stand-pipe $a$, into which liquid is introduced through a nozzle $l$. In the arrangement shown the liquid is introduced through an inverted siphon-pipe $b$ from a supply-cock $c$. The liquid issuing through the nozzle $l$ first falls onto a convex plate $d$, from which that portion which is not converted into spray falls onto the spraying-rings $e$ $e'$ to $e^4$, arranged below the plate $d$.

Figure 3:
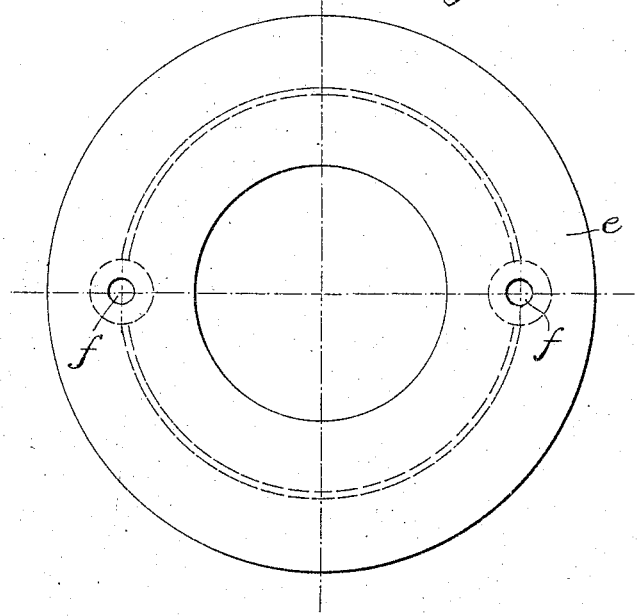

The spraying-rings $e$ have a convex upper surface and conical side surfaces, Figs. 2 and 3. Holes $f$ serve for the passage of rods $g$, by means of which the spraying-rings are held suspended at a certain distance apart. At the lower ends of the holes $f$ are preferably provided funnel-shaped projections serving to prevent the liquid from flowing down along the rods $g$.

The action of the apparatus is as follows: When a jet of liquid falls from the nozzle $l$ onto the convex metal or porcelain plate $d$, a portion of the liquid impinging upon the plate will be converted into spray projected in radiating lines, as indicated, so that the separate drops of liquid are distributed throughout the apparatus, while the portion of the liquid that is not converted into spray flows off from the edge of the disk $d$. This portion of the liquid falls upon the spraying-ring $e$, situated at a suitable distance below $d$, and as the upper surface of the ring $e$ is convex the liquid is also partly converted into spray and partly flows downward along the conical side surfaces of $e$. From these surfaces the unsprayed portion of the liquid falls onto the second spraying-ring, and so on, the liquid being eventually entirely converted into spray by means of the several rings $e'$ to $e^4$. By this means a very effective spraying and washing of the gas in the whole of the interior of the apparatus is effected.

The number of the spraying-rings employed will depend upon the height of the apparatus and the purpose for which it is used.

In existing gas-works the scrubbers with hurdles, &c., can be readily converted by the removal of the hurdles and the mounting of the above-described devices for the supply and spraying of the liquid in the scrubber-casing.

In place of the spraying-rings may be used spraying-plates with convex, concave, or flat upper surfaces and conical sides. In this case also the convex surface may be provided with holes that allow the liquid to flow through.

In the arrangement shown at Fig. 1 the lower edges of the spraying-rings are shown rounded. With this construction of the lower edges it may happen when there is a considerable supply of liquid that a portion of the liquid flowing in an oblique direction along the inclined surfaces may flow off in a slanting direction, so as to pass beyond the middle of the spraying-ring. It is advantageous in such cases to make the sides of the ring terminate in a sharp edge, from which the descending liquid will then always be made to fall vertically downward, as shown at Figs. 2 and 3.

What I claim, and desire to secure by Letters Patent of the United States, is—

1. In an apparatus of the class described, the combination with a vessel, of a plurality of successively-effective spraying devices, each presenting a convex imperforate surface for the lodgment of a liquid and provided with an inwardly-sloping under surface.

2. A spraying device of the class described, having a convex imperforate surface for the lodgment of liquid, the sides of said spraying device converging downwardly.

3. A spraying device of the class described, consisting of a ring tapered in cross-section and having a convex surface for the lodgment of liquid thereon.

In witness whereof I have hereunto signed my name in the presence of two subscribing witnesses.

F. BURGEMEISTER.

Witnesses:
　A. THAYER,
　EUGENIO GAJO.